(12) United States Patent
Hatano

(10) Patent No.: US 7,398,941 B2
(45) Date of Patent: Jul. 15, 2008

(54) TAPE CARTRIDGE

(75) Inventor: Yasushi Hatano, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/808,652

(22) Filed: Jun. 12, 2007

(65) Prior Publication Data

US 2008/0001013 A1 Jan. 3, 2008

(30) Foreign Application Priority Data

Jun. 15, 2006 (JP) .............................. 2006-166599

(51) Int. Cl.
  *G11B 23/107* (2006.01)
(52) U.S. Cl. ....................... 242/348; 360/132
(58) Field of Classification Search ............. 242/332.4, 242/345, 348, 348.1, 348.2, 532, 532.3; 360/132, 360/134
  See application file for complete search history.

(56) References Cited

U.S. PATENT DOCUMENTS 5,002,237 A * 3/1991 Hirayama .................... 242/345
6,821,653 B2 * 11/2004 Fukushima et al.
2002/0162911 A1 * 11/2002 Kaneda et al. ............ 242/332.4
2004/0195417 A1 * 10/2004 Sotoh et al. .............. 242/348.2

FOREIGN PATENT DOCUMENTS

JP  2-158976 A  6/1990
JP  2005-259273 A  9/2005

* cited by examiner

*Primary Examiner*—William A Rivera
(74) *Attorney, Agent, or Firm*—Sughrue Mion, PLLC

(57) ABSTRACT

A tape cartridge including a tape capable of recording and reproducing a high accuracy servo signal, by preventing a deformation of the tape by preventing turning up of a front end portion of a tape when the front end portion is adhered to a reel hub. The tape cartridge includes the tape, a single reel having a reel hub around which the tape is wound and a cartridge case in which the reel is installed, and the front end portion of the tape is adhered to the reel hub, and each corner of the front end portion of the tape is chamfered and chamfers are formed.

18 Claims, 8 Drawing Sheets

TAPE CARTRIDGE

CROSS REFERENCE TO RELATED APPLICATIONS

This application claims the foreign priority benefit under Title 35, United States Code, §119(a)-(d) of Japanese Patent Application No. 2006-166599 filed on Jun. 15, 2006 in the Japan Patent Office, the disclosure of which is herein incorporated by reference in its entirety.

BACKGROUND OF THE INVENTION

1. Field of the Invention

The present invention relates to a tape cartridge of a single reel type.

2. Description of the Related Art

Conventionally, in a single reel type tape cartridge, a tape has been wound around a hub of a reel contained in a cartridge case at the last stage of assembly. Since it is necessary to adhere one end portion (a front end portion) of the tape stably to the hub when winding starts, in order to wind the tape soundly around the hub, various methods for adhering the tape to the hub have been proposed. Hereunder, the adhering methods are described, referring to FIG. 7 and FIG. 8. FIG. 7A shows a cross-section of a transport means for a tape front end; FIG. 7B is a plane view of the transport means for the tape front end, viewing FIG. 7A along a direction A; FIG. 7C is a view illustrating a condition of adhering a tape around a hub after the state of FIG. 7A; and FIG. 7D is a side view viewing FIG. 7C along a direction B. FIG. 8A and FIG. 8B are views, illustrating a conventional tape cartridge, wherein FIG. 8A is a plane view of a tape reel and FIG. 8B is an enlarged view of a deformed part of a tape wound to a tape reel.

For example, a tape winder described in Japanese Laid-open Patent Application No. 2004-70005, includes a cartridge support unit which holds a cartridge containing a reel without a magnetic tape (tape hereinafter) wound thereon, and a tape introduction unit which introduces a tape into the cartridge. Referring to FIGS. 7A to 7D, the tape introduction unit 122 includes a suction part where a tape MT is sucked, and an applicator 128 where a liquid such as alcohol is applied to a hub surface of the reel, as shown in FIG. 7A and FIG. 7B, respectively. Further, flanges 105A (omitted in FIG. 7C) and 105B are placed along both sides of a hub H, as shown in FIG. 7C and FIG. 7D. Then, through inserting the tape introduction unit 122 sucked with the front end of the tape MT into the inside of the cartridge, the tape winder applies alcohol along the hub surface using the applicator 128, firstly. Then, the tape winder adheres the tape MT to the hub, by contacting the tape to the hub surface applied with alcohol. Then, the tape winder winds up the tape MT around the hub, by rotating a reel CR (refer to FIG. 8) in a reel drive unit.

A front end portion of a tape may sometimes turn up over the hub when the tape is adhered to the hub, due to a difference in stretch properties between an upper face and a lower face, or due to core set. Therefore, according to the tape winder described in Japanese Laid-open Patent Application No. 2004-70005, if either an amount or a width of alcohol being applied is not satisfactory, the front end corner 125 of the tape MT may turn up as shown in FIG. 7C and FIG. 7D, because the front end portion of the tape MT would not be adhered completely to the surface of the hub H.

If the front end corner 125 turns up when the tape MT is adhered to the hub H, a small crevice S for the turned-up height of the front end corner 125 may be formed between the hub H and the tape MT, as illustrated in the enlarged view of part A in FIG. 8. Due to the winding force of the tape, accumulated with increasing winding turns of the tape over the crevice S, the crevice S will collapse and then small surface waviness will be formed in the vicinity of the crevice S, which will bring a radial deformation along a radial direction of the tape.

This radial deformation of the tape MT has been a cause of some error such as recording miss which appears in magnetic record reproduction, because of the instability of track positioning which is generated by variation of the tape position along width direction when feeding the tape from the reel CR.

SUMMARY OF THE INVENTION

The present invention seeks to provide a tape cartridge capable of recording and reproducing record of a high accuracy servo signal, by preventing a deformation of a wound up tape through preventing turning up of a front end portion of a tape when the front end portion of the tape is adhered to a hub.

A tape cartridge according to the present invention, which resolves the foregoing drawbacks of the prior art comprises a tape; a single reel having a hub around which a tape is wound; and a cartridge case in which the reel is housed, wherein a front end portion of the tape is adhered to the hub, and a chamfered portion is formed at each corner of the front end portion of the tape by being chamfered.

According to the present invention, turning up of the front end portion of the tape can be prevented while the tape being wound around the hub, thanks to the chamfered portion formed at each corner of the front end portion of the tape. In this way, the radial deformation of the tape can be prevented, because the tape can be adhered stably to the hub.

The chamfered portions can be an arc shape.

With this design, the tape can be adhered stably to the hub, because no corner remains in the front end portion of the tape thanks to the arc shaped chamfered portions.

Each chamfered portion may be straight and makes an angle of 45 degrees to each side of the tape.

With this design, the tape can be adhered more stably to the hub, preventing turning up of the front end portion of the tape over the reel hub, because each corner is not so sharp and is properly chamfered.

The chamfered portions may be formed in one third width of the tape full width, respectively.

With this design, the tape can be adhered stably to the hub, because the front end portion of the tape does not have a so sharp portion, because of the configuration in which right and left corner chamfered portions and center portion of the front end portion of the tape have one third width of the tape full width, respectively.

Other features and advantages of the present invention will be apparent from the following description.

BRIEF DESCRIPTION OF THE DRAWINGS

An embodiment of the present invention will be described in detail based on the following drawings, wherein:

FIG. 8A and FIG. 8B are views illustrating a conventional tape cartridge, wherein FIG. 8A is a plane view of a tape reel, and FIG. 8B is an enlarged view of a deformed part of the tape wound around the tape reel.

DESCRIPTION OF THE PREFERRED EMBODIMENTS

Embodiments of a tape cartridge according to the present invention will be described in detail with reference to the accompanying drawings.

First Embodiment

A configuration of a tape cartridge 1 according to the present invention will be described, firstly.

Figure 1:
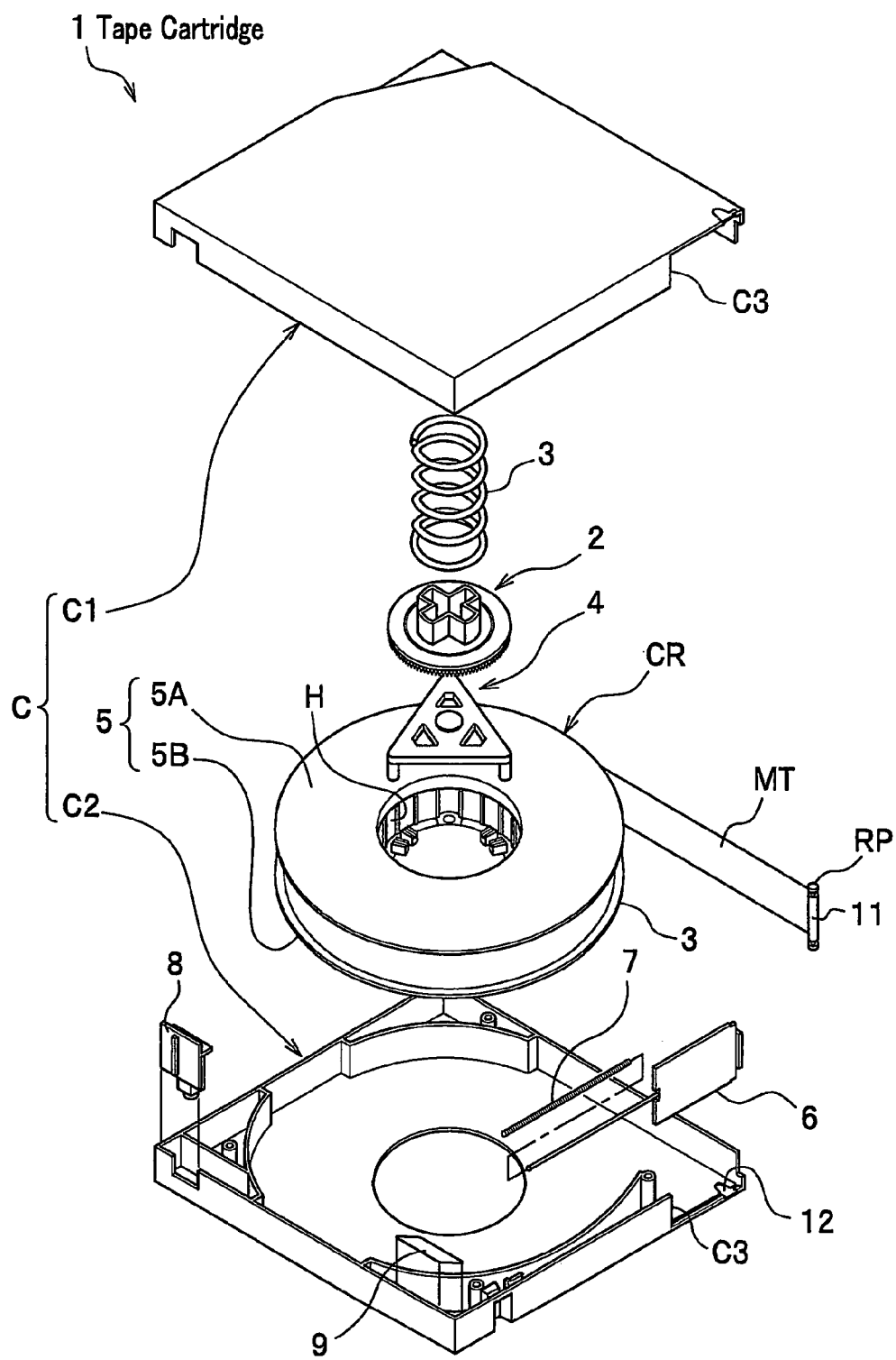
FIG. 1 is an exploded perspective view of a tape cartridge according to a first embodiment of the present invention.

The tape cartridge 1 of FIG. 1 conforms to the so-called LTO (Linear Tape-Open) standard and includes, in a cartridge case C divided to an upper half C1 and a lower half C2, a single reel CR; a lock plate 2 and a compressive coil spring 3 for locking a rotation of the reel CR; a release pad 4 for releasing a lock of the reel CR; a hub H around which a tape MT is wound; a flange 5 including an upper flange 5A and a lower flange 5B welded to the hub H; a slide door 6 which opens and closes a tape-pull-out opening C3 provided across the lower half C2 and the upper half C1 in the cartridge case C; a torsion coil spring 7 which pushes the slide door 6 to a closing position of a tape-pull-out opening C3; a safety lug 8 for preventing erroneous erasure; a cartridge memory chip 9; a reel pin RP; and a clip 11. FIG. 1 illustrates a state where the tape MT is wound in the reel CR.

Figure 2A:
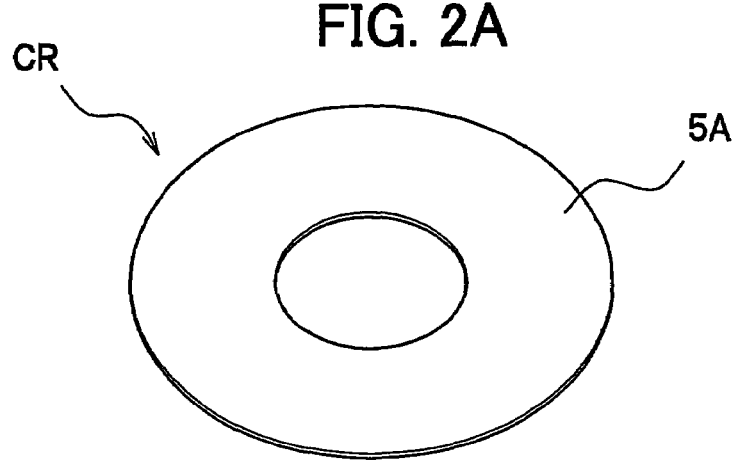
FIG. 2A is an exploded perspective view illustrating a reel part in FIG. 1.
Figure 2A:
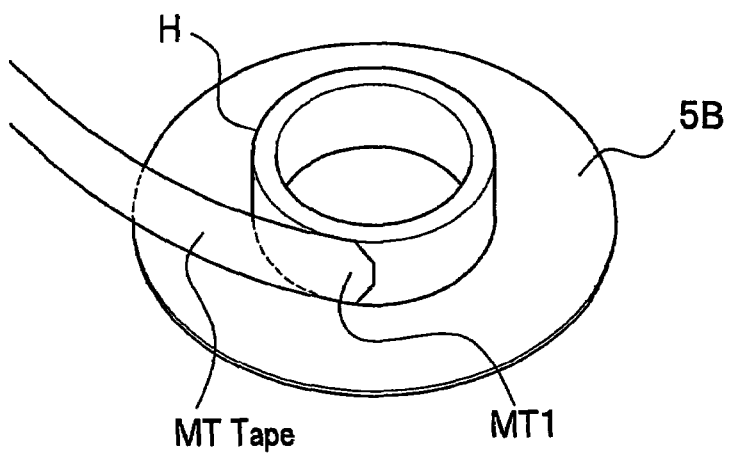
Figure 2B:
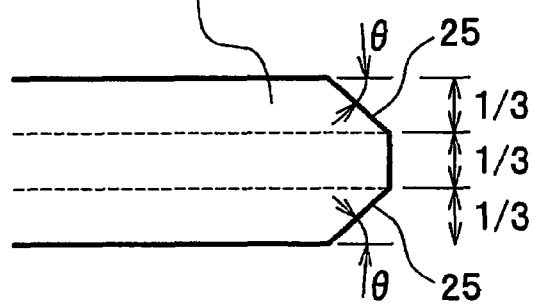
FIG. 2B is an enlarged view of a front end portion of a tape adhered to a reel hub.

Next, a detailed description is given on the tape MT, referring to FIG. 2A and FIG. 2B.

As illustrated in FIG. 2A, a front end portion MT1 of the tape MT is adhered to a surface of the hub H, and then the tape MT is wound around.

Here, a description will be given on a configuration of the reel CR for the tape MT, especially on a configuration of the hub H and the flange 5 fixed to the hub H.

The front end portion MT1 of the tape MT is adhered to and wound around the hub H with a cylindrical shape.

The flange 5 with a disk shape (refer to FIG. 1) is composed of a hard material such as plastics, and includes the upper flange 5A and the lower flange 5B. The upper flange 5A and the lower flange 5B are placed at one end and at the other end of the cylindrical shape hub H respectively, both perpendicularly placed to a rotating axis of the hub H.

The lower flange 5B and the hub H are integrally molded. The upper flange 5A and the hub H are fixed using any known method of an ultrasonic welding, an adhesive bonding, etc.

The upper flange 5A has an opening at its center portion.

As illustrated in FIG. 2B, chamfered portions 25, 25 are formed by chamfering each corner of the front end portion MT1 of the tape MT to be adhered to the hub H.

Each of the chamfered portions 25, 25 is straight and makes an angle θ to each side of the tape (45 degrees in the first embodiment, for example), respectively.

It is preferable to form right and left corner chamfered portions 25, in one third width of the full width of the tape MT, taking into consideration a balance between the chamfered portions 25, 25 and the front end portion MT1.

At this time, an edge angle (not illustrated) of a tape cutter 80 (refer to FIG. 3) described later is pre-adjusted, so that each chamfered portion is straight and form an angle of 45 degrees to each side of the tape MT.

Next, a description is given on a configuration of a tape winder W for manufacturing a tape cartridge 1 according to the first embodiment.

Figure 3:
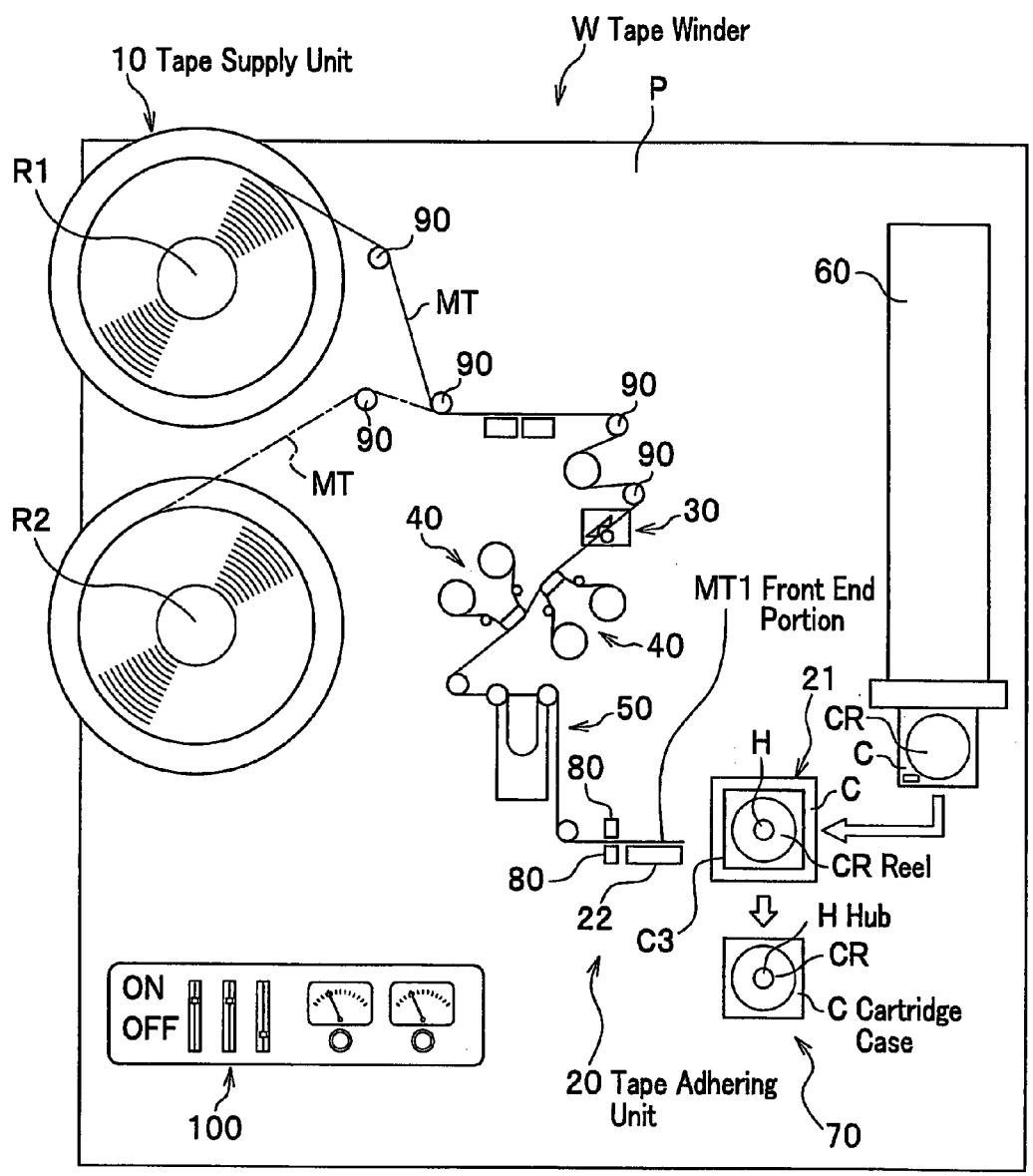
FIG. 3 is a schematic block diagram illustrating a tape winder for manufacturing the tape cartridge according to the first embodiment.

FIG. 3 illustrates an outline of a configuration of the tape winder W for manufacturing the tape cartridge 1 according to the first embodiment.

The tape winder W illustrated in FIG. 3 winds up the tape MT in a pancake shape in the reel CR, around the hub H of the reel CR installed in the cartridge case C, after cutting the tape MT to a pre-determined length. A tape adhering unit 20 for adhering the front end portion MT1 of the tape MT to the hub H of the reel CR installed in the cartridge case C is disposed in the tape winder W.

As illustrated in FIG. 3, the tape winder W mainly includes a tape supply unit 10; a tape adhering unit 20; a blade unit for polishing a surface of the tape MT; a cleaning units 40, 40 for cleaning both surfaces of the tape MT; a tension adjusting unit 50 for adjusting a tension of the running tape MT; a cartridge case supply part 60 for supplying the stocked cartridge case C to the tape adhering unit 20; a cartridge discharge port 70 which discharges the cartridge case C with the tape MT wound up by the reel CR thereof; and a tape cutter 80 for cutting the tape MT, which is placed in an upstream side of the tape adhering unit 20 in a running direction of the tape MT to.

A plurality of tape guides 90 are properly arranged in a panel P for guiding the tape MT to the tape adhering unit 20.

In the first embodiment, the tape adhering unit 20 has a function of winding up the tape MT around the hub H as well.

A manipulation panel for operating the tape winder W is given by numeral "100" in FIG. 3.

The tape supply unit 10 supplies the tape MT to the tape adhering unit 20, including the reel R1 and the reel R2 to which the tape MT is wound in a pancake shape. The tape supply unit 10 supplies the tape MT toward the tape adhering unit 20, by rotating a reel drive unit (not illustrated) at a pre-determined rotation speed. The tape adhering unit 20 can supply continuously the tape MT to the tape adhering unit 20, by replacing one reel R1 to the other reel R2 when the tape MT in one reel R1 is run out, because the two reels R1 and R2 are equipped.

The tape adhering unit 20 adheres the front end portion MT1 of the tape MT supplied from the tape supply unit 10 to the hub H of the reel CR in the cartridge case C, and further has a function winding the tape MT around the hub H.

According to FIG. 3, the tape adhering unit 20 includes a case installation part 21 where the cartridge case C is installed and a tape-front-end-portion transport unit 22 which transports the tape MT supplied from the tape supply unit 10 to the cartridge case C.

The case installation part 21 holds the cartridge case C, in a state where the tape-pull-out opening C3 of the cartridge case C is turned to the tape-front-end-portion transport unit 22.

A tape cutter 80, with an upper edge and a lower edge, cuts the tape MT along a junction line of the upper edge and the lower edge, and is turnably attached around an axis center so that the front end portion MT1 of the tape MT is cut straightly in a direction which makes an angle of 45 degrees to each side of the tape MT, and so that the tape MT is cut in the width direction after a pre-determined length of the tape MT is wound up to the reel CR.

Figure 4:
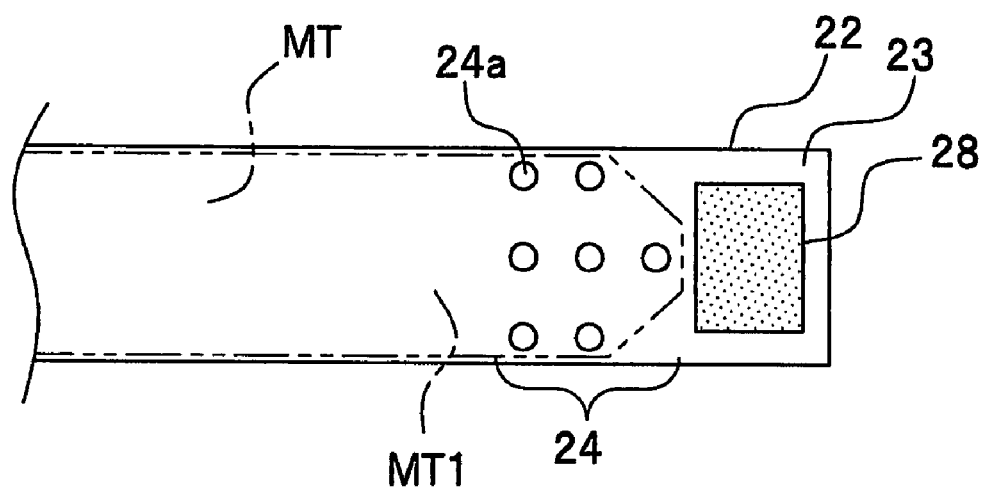
FIG. 4 is a plane view, illustrating a main part of a transport unit for the front end portion of the tape which retains the tape by sucking according to the first embodiment.

FIG. 4 is a plane view of a main part of the tape-front-end-portion transport unit 22 in which the tape MT is sucked in the tape cartridge C according to the first embodiment.

As illustrated in FIG. 4, the tape-front-end-portion transport unit 22 is a lengthwise long block. The tape-front-end-portion transport unit 22 is provided at a position displaced in a horizontal direction from the tape-pull-out-opening C3 of the cartridge case C installed at the case installation part 21 (refer to FIG. 3), and has a function of transporting the tape MT through sucking the vicinity of the front end portion MT1 of the tape MT supplied from the tape supply unit 10. Accordingly, the tape-front-end-portion transport unit 22 is designed to move from the tape-pull-out opening C3 to the inside of the cartridge case C, by a drive mechanism utilizing such an air cylinder, etc., (not illustrated).

On the upper side of the tape-front-end-portion transport unit 22, a sponge mount part 23 and a suction part 24 are formed in turn from a front end (near the cartridge case C).

A sponge 28 is mounted on a concave portion formed at the sponge mount part 23. The sponge mount part 23 is configured so that, for example, alcohol (liquid) for adhering such as ethanol being supplied to inside thereof and accordingly, proper amount of alcohol permeates the sponge 28 constantly.

The sponge 28 is a rectangular shape block with a height slightly larger than the depth of the sponge mount part 23. The sponge 28 is used for applying alcohol to the hub H of the reel CR in the cartridge case C (refer to FIG. 3). It is preferable that the sponge 28 is of a resistant (chemical resistant) type against chemicals such as alcohol. The sponge 28 easily applies alcohol to the surface of the tape MT even just after being immersed in alcohol, due to flexibility thereof even during a drying time. Moreover, the sponge 28 can be used repeatedly without getting deformed because of its chemical resistance.

The suction part 24 has a plurality of open holes 24a. These holes 24a are converged into one passage within the block of the tape-front-end-portion transport unit 22, and a vacuum pump and a compressor through a hose, a switching valve and the like are connected to the passage. During transporting the tape MT, the holes 24a can suck the tape MT as illustrated in FIG. 4, wherein a vacuum pump is connected to the holes 24a.

Meanwhile, the holes 24a can blow the tape MT toward the hub H, by switching the valve to be connected to the compressor.

Next, a manufacturing method of the tape cartridge 1 according to the first embodiment is described.

FIG. 5 illustrates operations of the tape adhering unit 20 of the tape cartridge 1 according to the first embodiment.

Figure 5A:
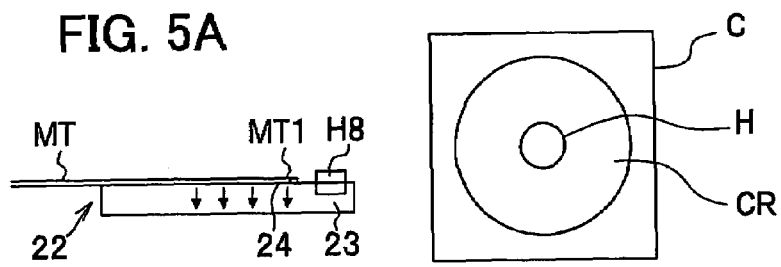
FIG. 5 is a view illustrating operation of a tape adhering unit in the tape cartridge according to the first embodiment.
Figure 5B:
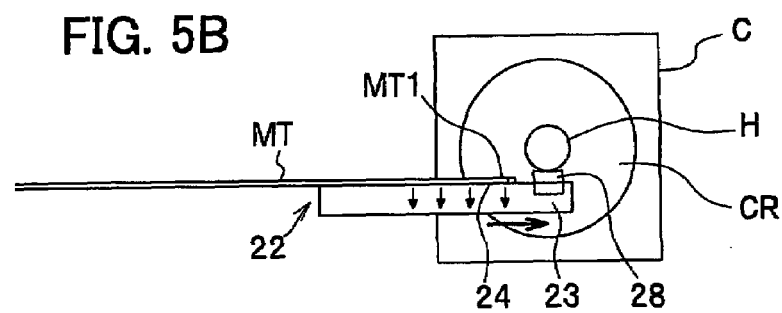

As illustrated in FIG. 5A, firstly the tape MT is vacuum-sucked to the holes 24a of the suction part 24 (refer to FIG. 4) by a vacuum pump (not illustrated). Then, the sponge 28 is contacted with the hub H in the cartridge case C by horizontally shifting the tape-front-end-portion transport unit 22, as it is. Accordingly, a proper amount of alcohol is applied to the hub H by the sponge 28 permeated with alcohol. Then, alcohol can be applied on the circumference surface of the hub H by rotating thereof.

Figure 5C:
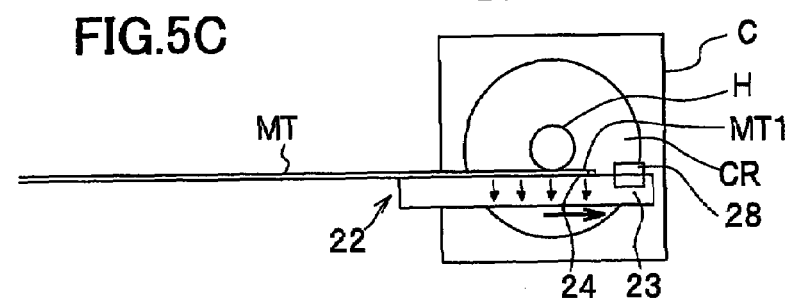
Figure 5D:
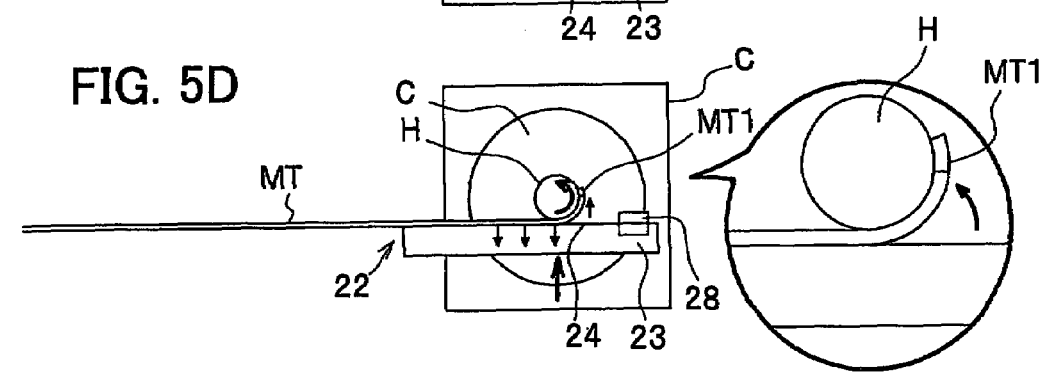

As illustrated in FIG. 5C, the tape-front-end-portion transport unit 22 is moved forward to a position where the suction part 24 is located below the hub H. The front end portion MT1 of the tape MT is blown to the hub H, by supplying compressed air to the holes 24a (refer to FIG. 3) after releasing the vacuum suction of the holes 24a, while the tape-front-end-portion transport unit 22 is moved upward, by rotating the hub H. Since the chamfered portions 25, 25 are provided at each corner of the front end portion MT1 of the tape MT, the tape MT is forced in accordance with the hub shape, while the alcohol applied to the hub spreads over the front end portion MT1, as illustrated in a right side enlarged part of FIG. 5D. In this way, the front end portion MT1 of the tape MT is adhered fitly along the hub H.

Figure 5E:
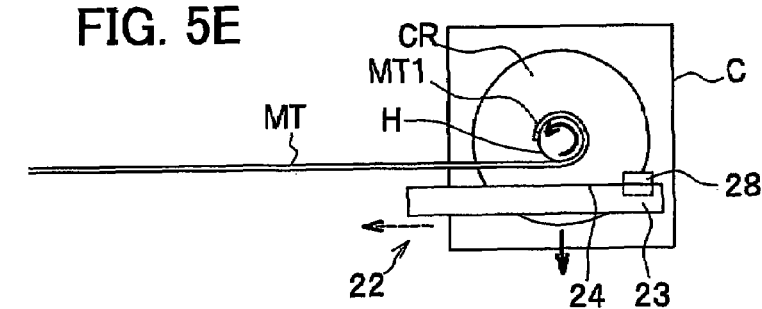

Then, as shown in FIG. 5E, the tape-front-end-portion transport unit 22 is slightly lowered and is retreated out from the cartridge case C. In this way, the adhering operation of the tape MT to the hub H finishes.

Then, the tape MT is wound up in the reel CR, by driving to rotate the reel CR using a reel drive means (not illustrated).

After the tape MT is wound up by a required amount, the tape cutter 80 (refer to FIG. 3) cuts off the tape, and the tape cartridge 1 is discharged from a tape cartridge discharge port 70 (refer to FIG. 3).

At this time, the front end portion MT1 of the tape MT is cut by the tape cutter 80 (refer to FIG. 3) and the chamfered portions 25, 25 are formed, and the tape cartridge 1 is manufactured one by one, by adhering the front end portion MT1 of the tape MT to the hub H of the next tape cartridge 1.

Accordingly, the following effect can be obtained in the first embodiment.

The turning up of the front end portion MT1 of the tape MT can be prevented and the tape MT can be wound up tightly to the reel CR, thanks to the chamfered portions formed at the front end portion MT1 of the tape MT, even if the alcohol applied to the hub H volatilizes, or alcohol does not spread to each corner of the front end portion MT1 due to an insufficient width of the alcohol being applied to the tape MT. Accordingly, the radial deformation of the wound up tape MT can be prevented. The turning up of the front end portion MT1 of the tape MT can be prevented effectively, since the front end portion MT1 of the tape MT has no sharp portion, thanks to the chamfered portions 25, 25 which are formed in such a manner that the chamfered portions 25, 25 and the center part at the front end portion MT1 of the tape MT have each one third width of the full width of the tape MT.

Second Embodiment

Next, a description will be made on a tape cartridge 1' according to a second embodiment of the present invention.

Since, in the tape cartridge 1' according to the second embodiment, the shape of the front end portion MT1 of the tape MT according to the first embodiment is changed only, the same symbols are used in the same configuration as those in the tape cartridge 1 according to the first embodiment, and a duplicated description will be omitted.

Figure 6A:
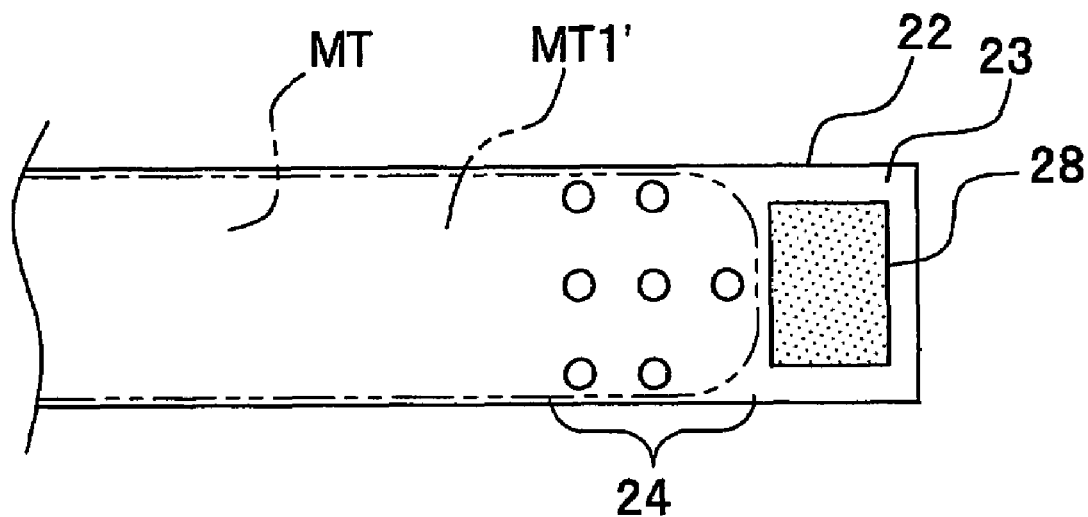
FIG. 6A is a plane view and an enlarged view of a part, of the main part of the transport unit of the front end portion of the tape which retains the tape to be sucked and wound around in the tape cartridge according to the second embodiment of the present invention.

FIG. 6A is a plane view and a partial enlarged view of a part of the main part of the transport unit 22 of the front end portion MT1' of the tape MT which retains the tape to be sucked and wound around in the tape cartridge according to the second embodiment.

Figure 6B:
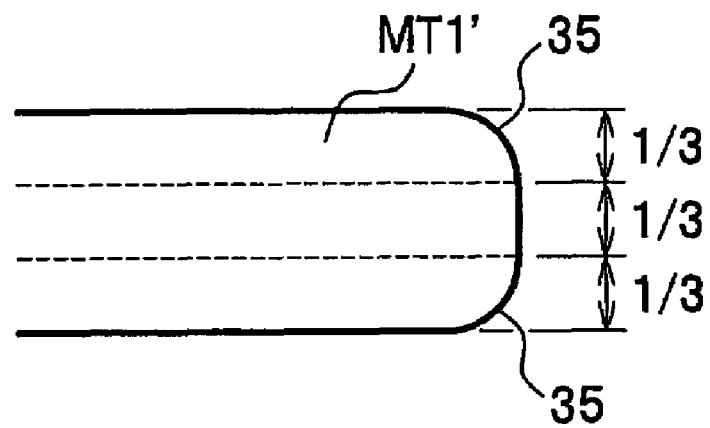
FIG. 6B is a plane view and an enlarged view of the front end portion of the tape having arc shaped chamfered portions to be sucked and wound around in the tape cartridge according to the second embodiment of the present invention.
Figure 7A:
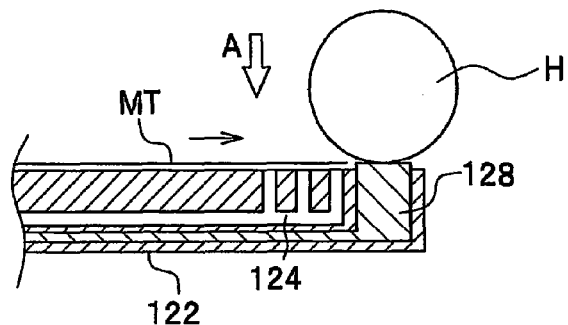
FIG. 7A is a cross-sectional view of a transport unit for the front end portion of the tape.
Figure 7B:
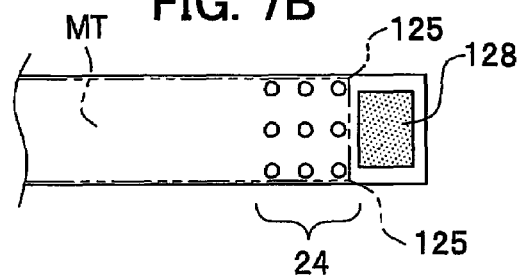
FIG. 7B is a plane view of the transport unit for the front end portion of the tape, viewing FIG. 7A along a direction A.
Figure 7C:
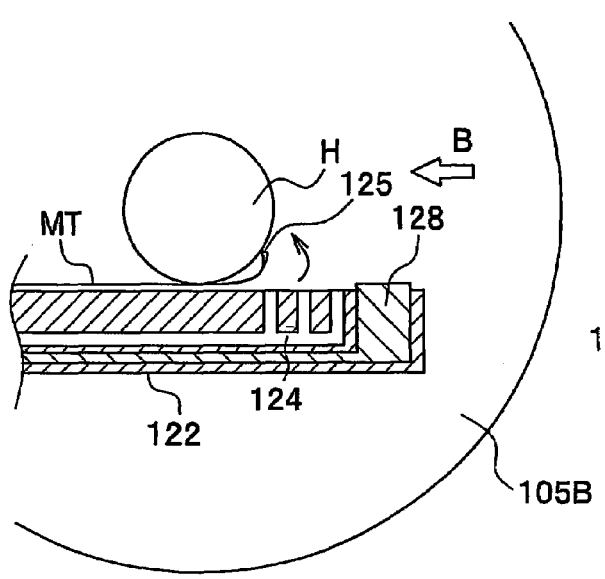
FIG. 7C is a view illustrating the condition of adhering the tape around the hub after the state of FIG. 7A.
Figure 7D:
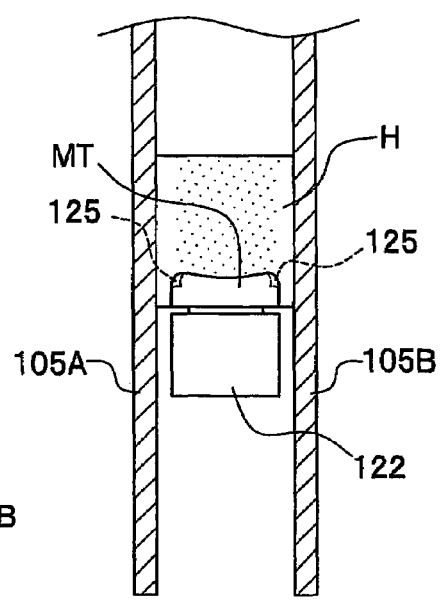
FIG. 7D is a side view viewing FIG. 7C along a direction B.
Figure 8A:
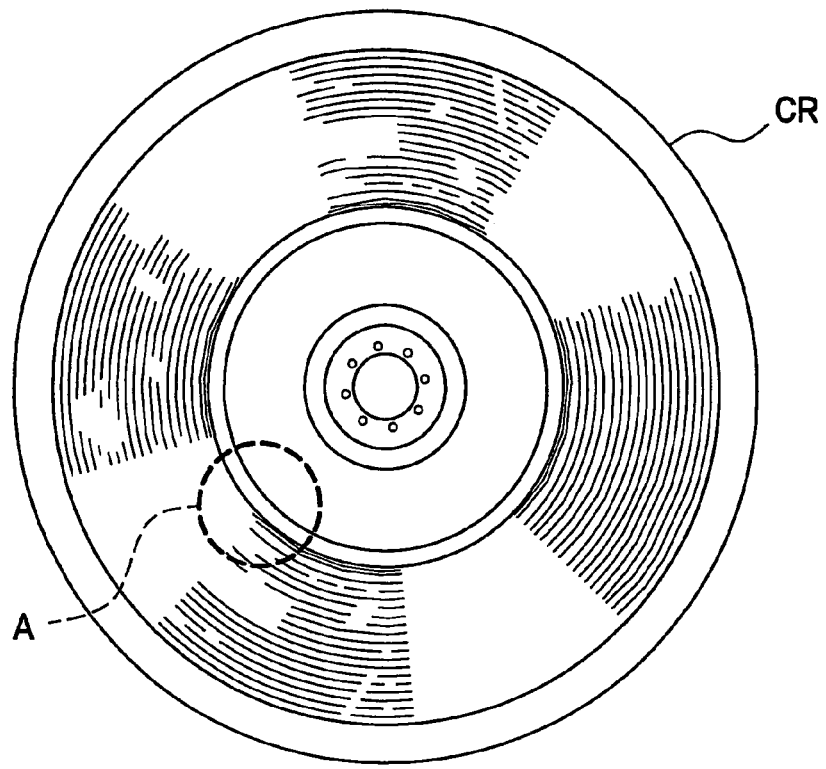
Figure 8B:
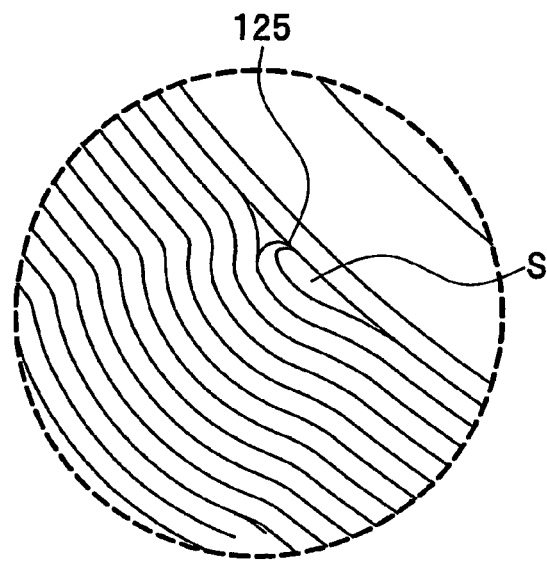

FIG. 6B is a plane view and an enlarged view of a front end portion MT1' of the tape MT having arc shaped chamfered portions to be sucked and wound around in the tape cartridge according to the second embodiment.

As illustrated in FIG. 6, in the tape MT of the tape cartridge 1' according to the second embodiment, the arc shaped chamfered portions 35, 35 are formed by chamfering the corners of the front end portion MT1' in an arc shape.

The arc shape chamfered portions 35, 35 and center part of the front end portion MT1' have each one third width of the full width of the tape MT.

A cutter described in Japanese Laid-open Patent Application No. 02-158976 is utilized preferably, for forming the arc shape chamfered portions 35, 35.

The front end portion MT1' of the tape MT formed accordingly is adhered to the hub H by the tape-front-end-portion transport unit 22.

Accordingly, the following effect can be obtained in the tape cartridge 1' according to the second embodiment.

The turning up of the front end portion MT1' of the tape MT can be prevented effectively, since the corners of the tape MT are removed, thanks to the arc shape chamfered portions 35, 35 formed at the corners so that the chamfered portions and center portion of the front end portion MT1' of the tape MT have each one third width of the full width of the tape MT.

The present invention is not limited to the above mentioned embodiments.

For example, various changes are possible on the shape of the front end portions MT1 and MT1' of the tape MT, if the turning up can be prevented.

The present invention can be applied to any one of a magnetic tape cartridge, an optical record tape cartridge, etc., if the turning up of a front end portion of a tape can be prevented.

What is claimed is:

1. A tape cartridge, comprising:
    a tape;
    a single reel having a hub around which the tape is wound; and
    a cartridge case in which the reel is installed,
    wherein one end portion of the tape is adhered to the hub, each corner of the end portion of the tape is chamfered and forms a chamfered portion.
2. A tape cartridge according to claim 1, comprising a magnetic tape cartridge.
3. A tape cartridge according to claim 2, wherein each of the chamfered portions is formed in an arc shape.
4. A tape cartridge according to claim 3, wherein each of the chamfered portions is formed to be one third of a full width of the tape.
5. A tape cartridge according to claim 2, wherein each of the chamfered portions is straight and makes an angle of 45 degrees against each side of the tape.
6. A tape cartridge according to claim 5, wherein each of the chamfered portions is formed to be one third of a full width of the tape.
7. A tape cartridge according to claim 2, wherein each of the chamfered portions is formed to be one third of a full width of the tape.
8. A tape cartridge according to claim 1, comprising an optical record tape cartridge.
9. A tape cartridge according to claim 8, wherein each of the chamfered portions is formed in an arc shape.
10. A tape cartridge according to claim 9, wherein each of the chamfered portions is formed to be one third of a full width of the tape.
11. A tape cartridge according to claim 8, wherein each of the chamfered portions is straight and makes an angle of 45 degrees against each side of the tape.
12. A tape cartridge according to claim 11, wherein each of the chamfered portions is formed to be one third of a full width of the tape.
13. A tape cartridge according to claim 8, wherein each of the chamfered portions is formed to be one third of a full width of the tape.
14. A tape cartridge according to claim 1, wherein each of the chamfered portions is formed in an arc shape.
15. A tape cartridge according to claim 14, wherein each of the chamfered portions is formed to be one third of a full width of the tape.
16. A tape cartridge according to claim 1, wherein each of the chamfered portions is straight and makes an angle of 45 degrees against each side of the tape.
17. A tape cartridge according to claim 16, wherein each of the chamfered portions is formed to be one third of a full width of the tape.
18. A tape cartridge according to claim 1, wherein each of the chamfered portions is formed to be one third of a full width of the tape.

* * * * *